US010636214B2

(12) United States Patent
Avramov et al.

(10) Patent No.: US 10,636,214 B2
(45) Date of Patent: Apr. 28, 2020

(54) VERTICAL PLANE OBJECT SIMULATION

(71) Applicant: Houzz, Inc., Palo Alto, CA (US)

(72) Inventors: Yossi Avramov, Tel Aviv (IL); Guy Shaviv, Zichron (IL)

(73) Assignee: Houzz, Inc., Palo Alto, CA (US)

( * ) Notice: Subject to any disclaimer, the term of this patent is extended or adjusted under 35 U.S.C. 154(b) by 34 days.

(21) Appl. No.: 15/853,031

(22) Filed: Dec. 22, 2017

(65) Prior Publication Data

US 2019/0197779 A1  Jun. 27, 2019

(51) Int. Cl.
*G06T 19/00*   (2011.01)
*G06F 3/0481*   (2013.01)

(52) U.S. Cl.
CPC ........ *G06T 19/006* (2013.01); *G06F 3/04815* (2013.01); *G06T 2210/04* (2013.01)

(58) Field of Classification Search
CPC .............. G06T 19/006; G06K 9/00671; G06K 9/00691
See application file for complete search history.

(56) References Cited

U.S. PATENT DOCUMENTS

| | | | |
|---|---|---|---|
| 9,552,674 B1 * | 1/2017 | Jayadevaprakash | G06T 19/006 |
| 9,818,224 B1 * | 11/2017 | Worley | G06T 19/006 |
| 2014/0317734 A1 * | 10/2014 | Valencia | G06F 21/552 726/22 |
| 2015/0063684 A1 * | 3/2015 | Taylor | G06T 7/536 382/154 |
| 2015/0332509 A1 * | 11/2015 | Jovanovic | G06T 15/20 345/427 |
| 2016/0189434 A1 * | 6/2016 | Fong | G06T 19/20 345/633 |
| 2016/0253842 A1 * | 9/2016 | Shapira | G02B 27/017 345/633 |
| 2017/0091577 A1 * | 3/2017 | Lee | G06K 9/00671 |
| 2018/0283877 A1 * | 10/2018 | Flint | G01C 21/206 |

OTHER PUBLICATIONS

NPL Video: Room Scan for iPhone [App], https://www.youtube.com/watch?v=iokz83SbcaQ; published Apr. 4, 2014; select screenshots included. (Year: 2014).*

Akenine-Moller, Thomas and Eric Haines. "Real-time rendering." 2nd ed. (2002), pp. 715-721. (Year: 2002).*

* cited by examiner

*Primary Examiner* — Daniel F Hajnik
(74) *Attorney, Agent, or Firm* — Schwegman Lundberg & Woessner, P.A.

(57) ABSTRACT

Disclosed are various embodiments for simulating one or more virtual objects (e.g., renders) on real-world walls of a room. Some embodiments detect a floor of the room, detect lack of movement of a device, determine an angle of the client device, and place a virtual object in a virtual environment. As the device is moved, a virtual camera can be continuously updated to correspond to movement of the device.

16 Claims, 12 Drawing Sheets

US 10,636,214 B2

VERTICAL PLANE OBJECT SIMULATION

TECHNICAL FIELD

The present disclosure generally relates to machines configured to the technical field of special-purpose machines that perform image processing and improvements to such variants, and to the technologies by which such special-purpose machines become improved compared to other special-purpose machines simulating depictions of objects placed on vertical planes.

BACKGROUND

Client devices can be used to view a live video feed of the surrounding environment. Items (e.g., a chair) can be simulated in the live video feed by overlaying an image or 3D model of the item over the live video feed. Planes of the surrounding environment can be detected in different ways, such as using image analysis to analyze images captured by client device cameras. While client devices can use image analysis to detect horizontal planes (e.g., floors), client devices have difficulty using image analysis to detect walls.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
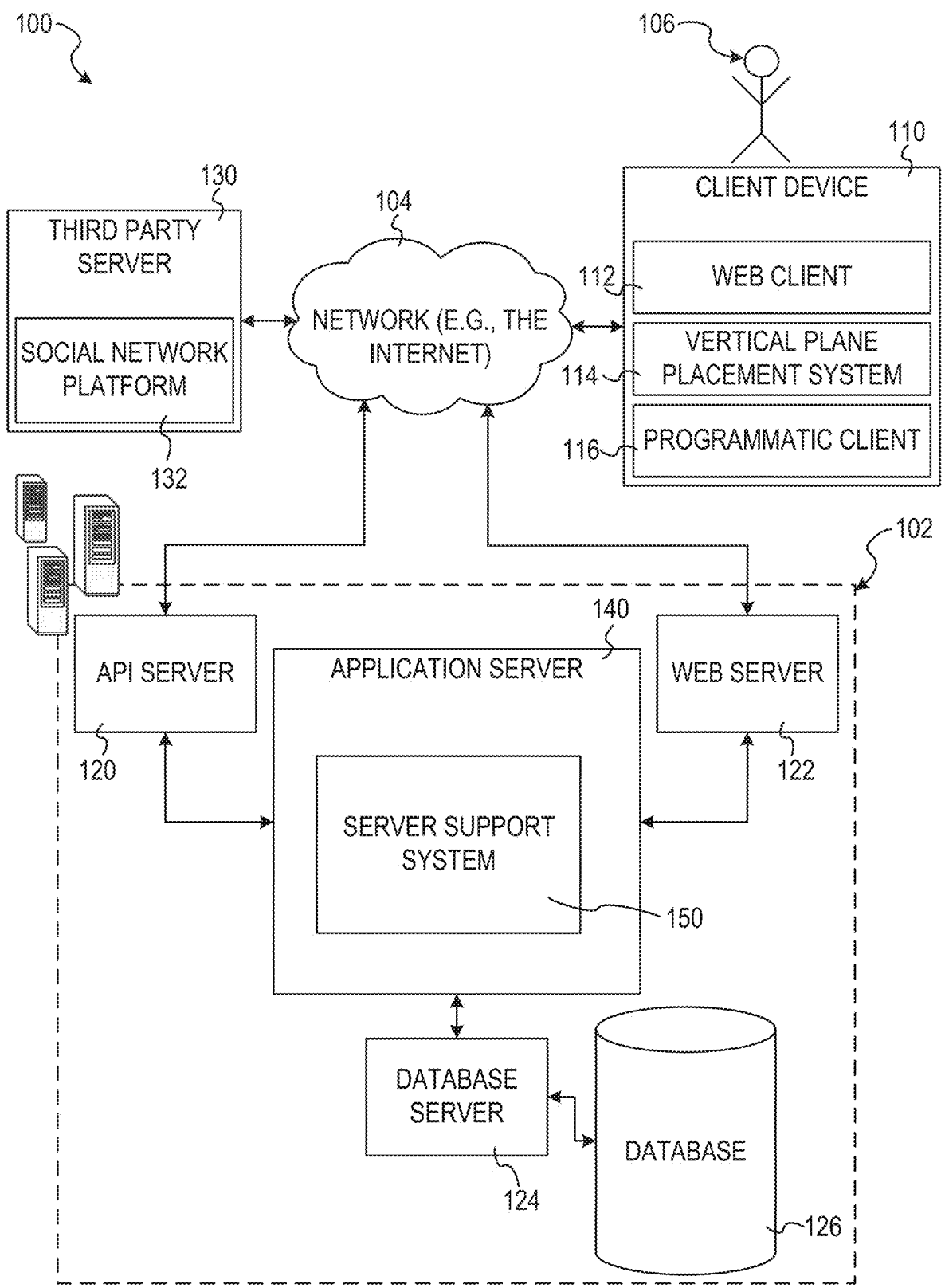
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned, using a client device to detect planes such as walls is difficult. While a client device may use a gyroscope to detect the floor of a room, detecting walls of the room is more complex. In particular, a client device can use its gyroscope to determine the direction of gravity and set a floor plane perpendicular to the direction of gravity. While the direction of gravity can yield information about planes perpendicular to it (e.g., the horizontal plane of a floor), the direction of gravity yields little to no information about planes parallel to it (i.e., an infinite amount of planes can be parallel to the gravity direction.) Likewise, while image feature analysis can be used to identify co-planar points of a floor, walls commonly have few image features and image feature based approaches often perform poorly in wall detection tasks. To this end, a plane detection system of a client device can use lack of movement of the client device to determine that the client device is pressed against a wall. The plane detection system can then create a vertical wall in a 3D model of the room and further generate a virtual camera to create depictions of the newly created wall. One or more 3D virtual objects can be placed on the newly detected wall in the 3D environment, and renders of the object can overlaid on live video feed of the room.

In some example embodiments, the plane detection system uses a gyroscope or image features of the floor to detect and generate a horizontal plane to coincide with the floor. Further, when the client device is pressed against the wall and lack of movement occurs for a pre-specified time-period, the plane detection system can validate that a wall has been detected by ensuring that the client device (or virtual camera vector of the modeling environment) is orthogonal to the downward direction or the previously detected floor plane. The client device can use an onboard camera to capture a live video feed as the client device is moved around the room. As the client device is moved around the room, image analysis of features in the room (e.g., window, furniture) can be used to move a virtual camera used to render the virtual wall and/or objects positioned on the virtual wall. The renders can be overlaid on the live feed and continuously updated to compensate for perspective and scale changes as the client device moves around the room. In this way, a client device can simulate depictions of virtual objects on real world vertical planes, such as walls of a room.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications such as a vertical plane placement system 114, and a programmatic client 116 executing on the client device 110. The client device 110 includes the web client 112, the vertical plane placement system 114, and the programmatic client 116 alone, together, or in any suitable combination.

Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultra-book, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps. In some implementations, the vertical plane placement system 114 includes various components operable to display a simulation of an item selected by user 106 on a vertical plane of a room in which the user 106 is located.

The web client 112 accesses the various systems of the networked system 102 via the web interface supported by a web server 122. Similarly, the programmatic client 116 and vertical plane placement system 114 accesses the various services and functions provided by the networked system 102 via the programmatic interface provided by an Application Program Interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, an application server 140. The application server 140 can host a server support system 150, which can provide content (e.g., items for three-dimensional simulation) to the content device 110, according to some example embodiments. The application server 140 is, in turn, shown to be coupled to a database server 124 that facilitates access to one or more information storage repositories, such as database 126. In an example embodiment, the database 126 comprises one or more storage devices that store information (e.g., item catalog data, 3D model data) to be accessed by server support system 150 or client device 110. Additionally, a third party application 132, executing on third party server 130, is shown as having programmatic access to the networked system 102 via the programmatic interface provided by the API server 120. For example, the third party application 132, utilizing information retrieved from the networked system 102, supports one or more features or functions on a website hosted by the third party.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server 140 can also be implemented as standalone software programs, which do not necessarily have networking capabilities.

Figure 2:
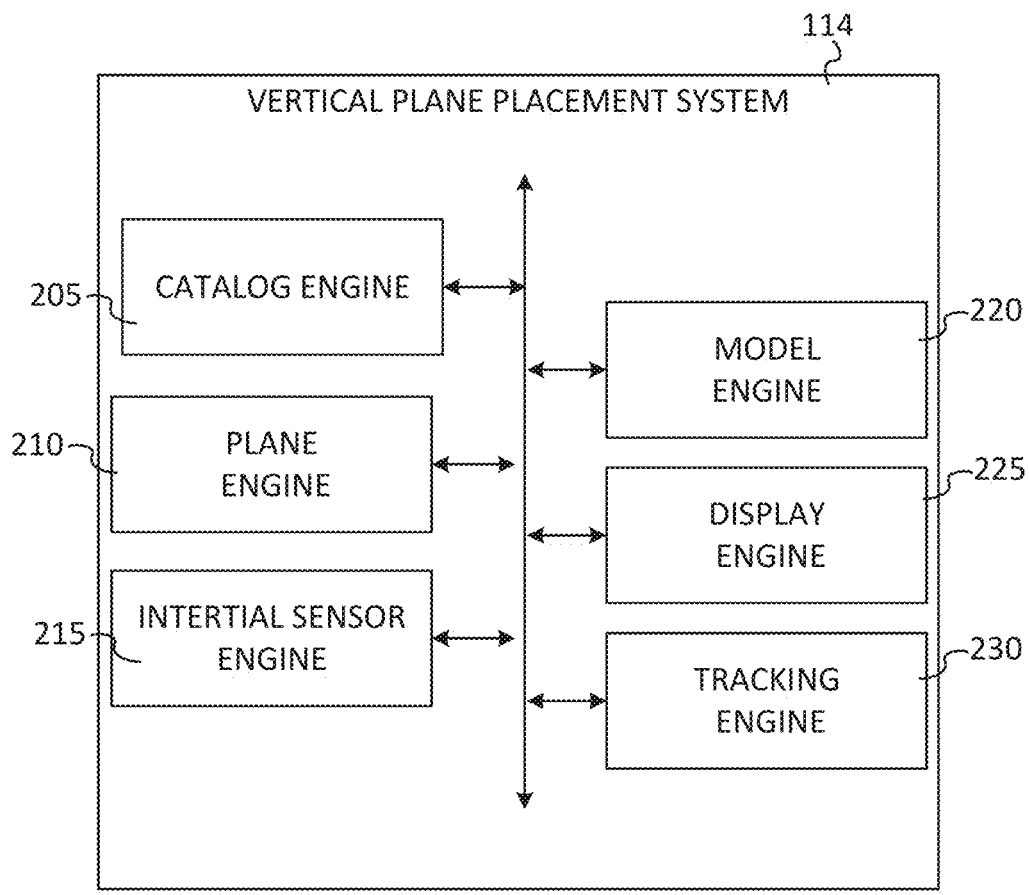
FIG. 2 is a block diagram showing example components provided within the system of FIG. 1, according to some example embodiments.

FIG. 2 shows example internal components of a vertical plane placement system 114, according to some example embodiments. The components themselves are communicatively coupled (e.g., via appropriate interfaces) to each other and to various data sources, so as to allow information to be passed between the applications or so as to allow the applications to share and access common data. Furthermore, the components access further data (e.g., item data, 3D model data) via the server support system 150 over network 104. As illustrated, the vertical plane placement system 114 comprises a catalog engine 205, a plane engine 210, a viewpoint engine 215, a model engine 220, a display engine 225, and a tracking engine 230. The catalog engine 205 is configured to display item data on a network site (e.g., website, mobile application). The plane engine 210 is configured to detect a wall as a vertical plane, and store data describing the vertical plane for user by other engines (e.g., the model engine 220). The viewpoint engine 215 manages accessing inertial sensors of the client device 110, such as an accelerometer, compass, or gyroscope, to generate vertical plane data and tracking data. The model engine 220 manages generating three-dimensional models of an environment and objects. The display engine 225 is configured to display images of an environment with objects simulated in the environment. The tracking engine 230 manages generating movement data that describes physical movement of the client device 110 using image analysis and inertial sensor data. The tracking engine 230 is further configured to adjust the position of 3D objects according to the movement data.

Figure 3A:
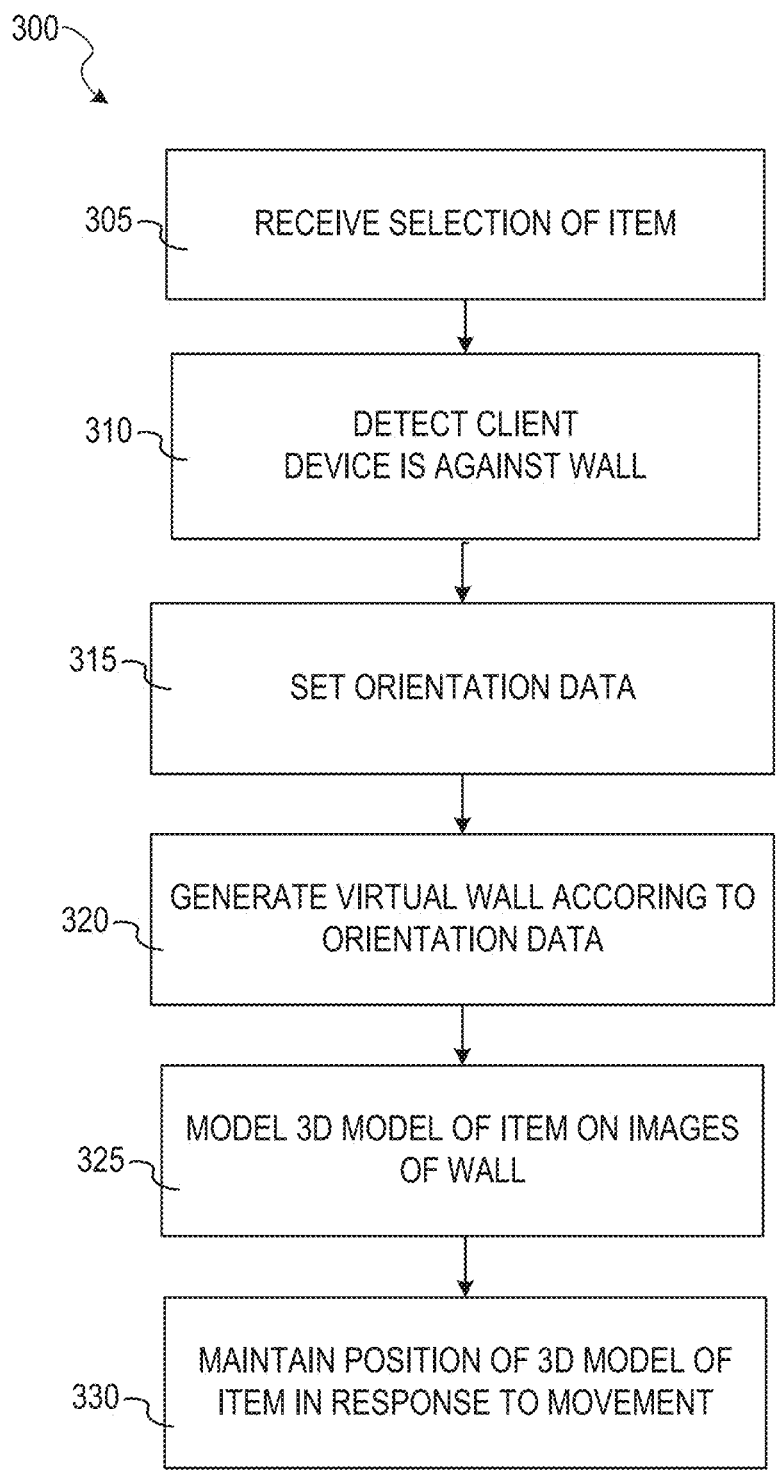
FIG. 3A shows a flow diagram of a method for simulating objects on a vertical plane, according to some example embodiments.

FIG. 3A shows a flow diagram of a method 300 for simulating objects on a vertical plane, according to some example embodiments. At operation 305, the catalog engine 205 receives selection of an item. For example, a user may be viewing a website or mobile application on client device 110 and select an item for simulation in the user's local environment. The catalog engine 205 may further determine whether the object is an object that is to be modeled on the floor (e.g., a chair, a floor lamp) or an object that is to be modeled on a wall (e.g., a wall lamp, a painting). If the catalog engine 205 determines that the object is to be modeled on the wall, the catalog engine 205 prompts the user to place his/her client device against the wall, as further discussed below.

At operation 310, the plane engine 210 detects that the client device has been placed against a wall. For example, the user 106 may walk to the nearest wall upon which the user 106 wants to see a painting, and holds the client device 110 flat against the wall. At operation 315, the viewpoint engine 215 sets orientation data that describes how the client device 110 is oriented against the wall. In some example embodiments, the orientation data sets a virtual camera used to render a 3D model of the environment to the current location of the client device 110 such that when the client device 110 is moved, the tracking engine 230 moves the virtual camera in a proportional amount, as discussed in further detail below with FIG. 9. In some example embodiments, the orientation data generated and set at operation 315 includes heading data (e.g., direction related to North, South, East, and/or West, etc.) and gyroscope data (e.g., attitude or angle in relation to a gravitational force). The viewpoint engine 215 generates the orientation data using one or more integrated inertial sensors of the client device 110, such as a compass or gyroscope. At operation 320, the model engine 220 generates a virtual wall according to the orientation data generated by the viewpoint engine 215. For example, the model engine 220 generates a 3D room model to correspond to the real-world environment in which the user 106 is holding the client device 110. In some example embodiments, the model engine 220 generates a virtual wall in the 3D room model having the angle in relation to the ground and the direction north, according to the orientation data. However, in some example embodiments, exact orientation is not known due to the client device 110 having imprecise sensors or not having inertial sensors at all. In those embodiments, the modeling engine 220 instead generates a wall and waits for image analysis tracking data to be generated so that the modeling engine 220 can change the location of the virtual camera relative to the virtual wall accordingly.

At operation 325, the model engine 220 models the 3D model of the selected item on images (e.g., video feed) of the wall. For example, the model engine 220 positions a 3D model of the selected item on the generated virtual wall in the 3D environment. Further, the model engine 220 creates a depiction (e.g., one or more renders) from a virtual camera viewing the virtual wall and the item model on the wall. Further, the model engine 220 (or display engine 225, according to some example embodiments) overlays the generated depictions on a live video feed of the room in which the user 106 is viewing through the client device 110 (e.g., via a live video feed captured by and displayed in real time by the client device 110). At operation 330, the tracking engine 230 maintains the position of the 3D model of the item in response to movement of the client device 110. For example, as the user 106 moves around the real-world room with the client device 110, the tracking engine 230 analyzes movement of image features in live video to determine how the client device is moving (e.g., farther away from the wall). In some example embodiments, the tracking engine 230 implements a local feature detection scheme (e.g., scale-invariant feature transform (SIFT)) to track the scale and/or location of image features to continuously update the position of the virtual camera so that it matches the position of the camera sensor on the client device 110. Further, in some example embodiments, feature detection analysis is triggered responsive to inertial sensors of the client device detecting movement of client device 110. In this way, the perspective and lighting of the depictions (e.g., renders) of the modeled item remain accurate, as the client device 110 views different parts of the real-world room.

Figure 3B:
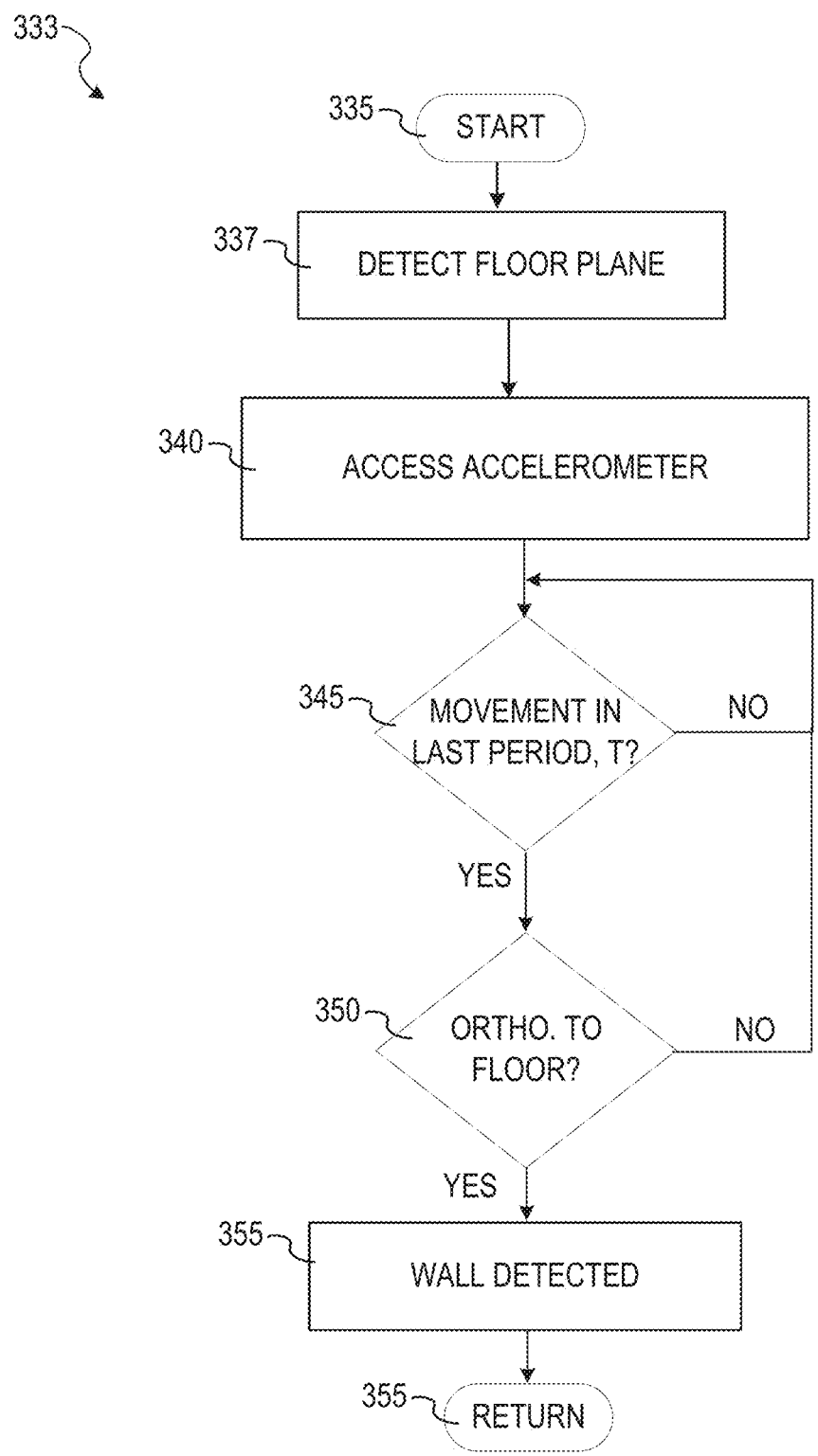
FIG. 3B shows a flow diagram of a method 333 of generating orientation data, according to some example embodiments.

FIG. 3B shows a flow diagram of a method 333 of setting orientation data, according to some example embodiments. As discussed, modeling objects on vertical planes, such as walls, can be challenging. To this end, method 333 is an approach for efficiently detecting walls for modeling of virtual objects. In some approaches, the method 333 is configured as a subroutine of operation 310 in which the plane engine 210 detects that the client device 110 is placed against a wall. If the method 333 is configured as a subroutine, the method 333 can be a function that initiates at start operation 335 and terminates at return operation 360, after which the generated data is stored for user by other engines. After start operation 335, the plane engine 210 detects a horizontal plane, e.g., a floor plane. In some example embodiments, the plane engine 210 may perform image analysis of images in alive feed being generated by client device 110 to detect image feature points that are likely to be co-planar and thus part of the floor plane. In some example embodiments, the plane engine 210 analyzes lighting, shadows, and dimension perspective lines of image features in the live feed to detect the floor plane at operation 337. At operation 340, the plane engine 210 accesses the accelerometer of the client device 110. At operation 345, the plane engine 210 determines whether the client device 110 has remained still for a pre-specified period of time, T (e.g., T=1 second, T=5 seconds). If the client device 110 has not remained still for the pre-specified period of time, the process may continuously loop until the accelerometer detects no movement for the time period T. In some example embodiments, to save power, the continuous checking for lack of movement is only triggered upon the user requesting that an item be simulated on a wall (e.g., operation 305 of FIG. 3A). In some embodiments, instead of checking for movement using the accelerometer at operation 345, the plane engine 210 waits for a user to select a button indicating that the user has placed the client device 110 against a wall. Further details are discussed below with reference to FIG. 7 (button 715).

Continuing, if the client device 110 has remained still for the pre-specified period of time, the method 333 continues to operation 350 where the plane engine 210 determines whether the client device 110 has been placed against a wall by determining whether the client device is orthogonal to the floor. For example, the user may have placed the client device 110 on the arm of a sofa or flat on the floor instead of a wall. To determine whether the client device 110 is orthogonal to the floor, thereby ensuring that a wall has been detected, the plane engine 210 accesses the gyroscope of the client device 110 and computes the angle (e.g., using the dot product or cosine of the dot product) between the detected floor plane of operation 337 and the current reading of the gyroscope. In some example embodiments, the plane engine 210 can determine whether the client device 110 is orthogonal to the floor by calculating the angle between the floor plane and the virtual camera used to render the floor, wall, and/or objects, as discussed in further detail below with reference to FIG. 9.

If the client device 110 is not orthogonal (perpendicular) to the floor, then the user is notified that the client device 110 is not against a wall and method 333 may loop back to operation 345. In some example embodiments, the user is not notified that no wall has been detected and instead the method 333 loops back to operation 345 until a wall has been detected. On the other hand, if the plane engine 210 detects that the angle between the device 110 and the floor plane is indeed orthogonal, then the plane engine 210 stores a value indicating that a wall has been detected at operation 355 (after which the wall may be created, object modeled, and so forth).

Figure 3C:
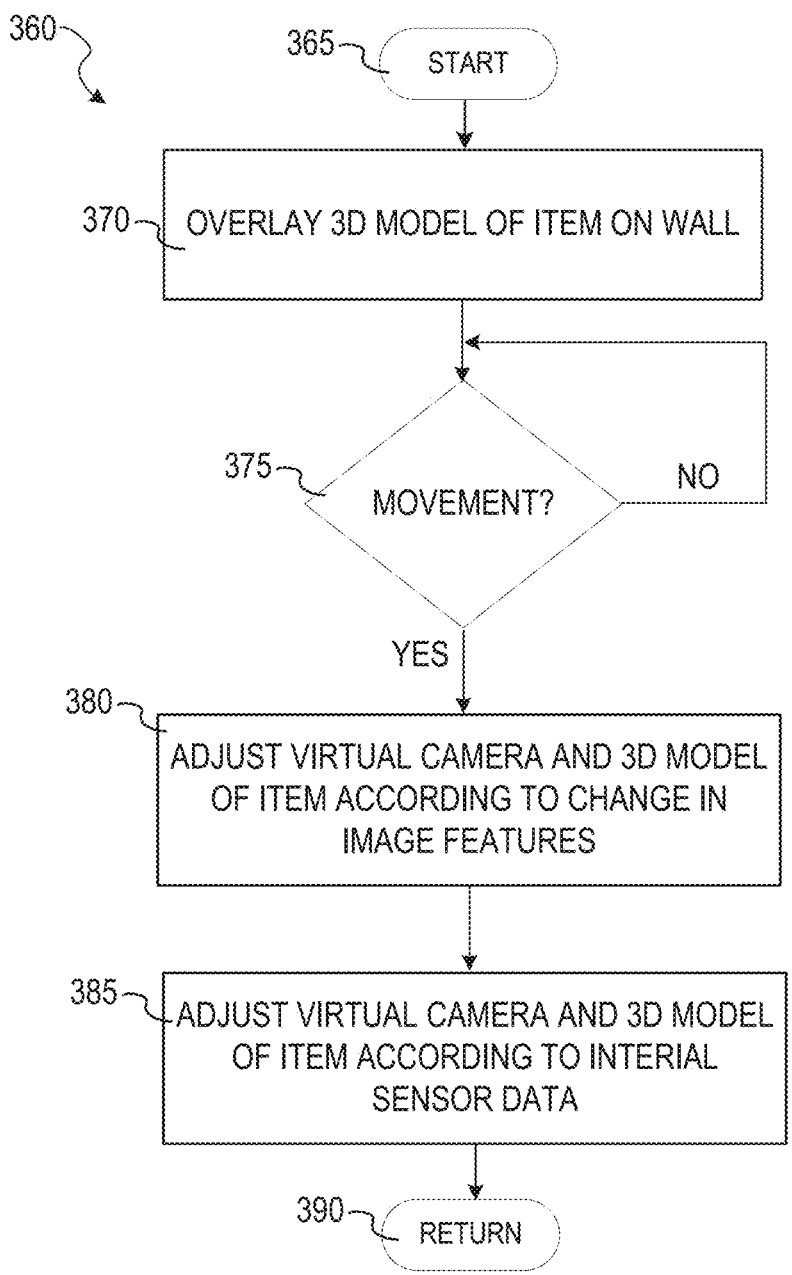
FIG. 3C shows a flow diagram of a method 363 of maintaining the object position on the wall, according to some example embodiments.

FIG. 3C shows a flow diagram of a method 363 of maintaining the object position on the wall, according to some example embodiments. The method 363 is configured as a subroutine of operation 330 in which the tracking engine 230 maintains the position of the 3D item relative to the client device 110 as the client device moves about. If the method 363 is configured as a subroutine, the method 363 can be a function that initiates at start operation 365 and terminates at return operation 390, after which the generated data can be used by other engines or otherwise stored. After start operation 365, the display engine 225 detects movement of the client device 110 at operation 375. If there is no movement detected, the method 363 loops until movement is detected. In some example embodiments, movement is detected by tracking feature points in live video captured by the client device 110. In some example embodiments, movement is detected using the accelerometer, the gyroscope, or the compass of the client device 110.

In response to movement being detected, at operation 380 the tracking engine 230 adjusts the position of the virtual camera and 3D model objects (e.g., the 3D model of the item) using computer vision analysis. For example, the tracking engine 230 can determine that plurality of feature points are moving closer to each other, and thereby determine that that the client device 110 is moving away from where it was when it detected the wall. Responsive to determining that that client device 110 is moving away from the wall, a virtual camera used to render the 3D model of the object (and the virtual wall) is moved away a corresponding distance. In some example embodiments, the tracking engine 230 performs operation 380 responsive to the inertial sensors detecting any movement. In those embodiments, while the inertial sensors serve as a trigger, the amount of distance or rotation of the client device 110 is extracted from image analysis of the live feed. Further, according to some example embodiments, at operation 385, the tracking engine 230 can adjust the virtual camera position according to inertial sensor data. For example, if the compass determines that the client device has been rotated clock wise to view a different portion of the room, the virtual camera can rotate clock wise as well.

Figure 4:
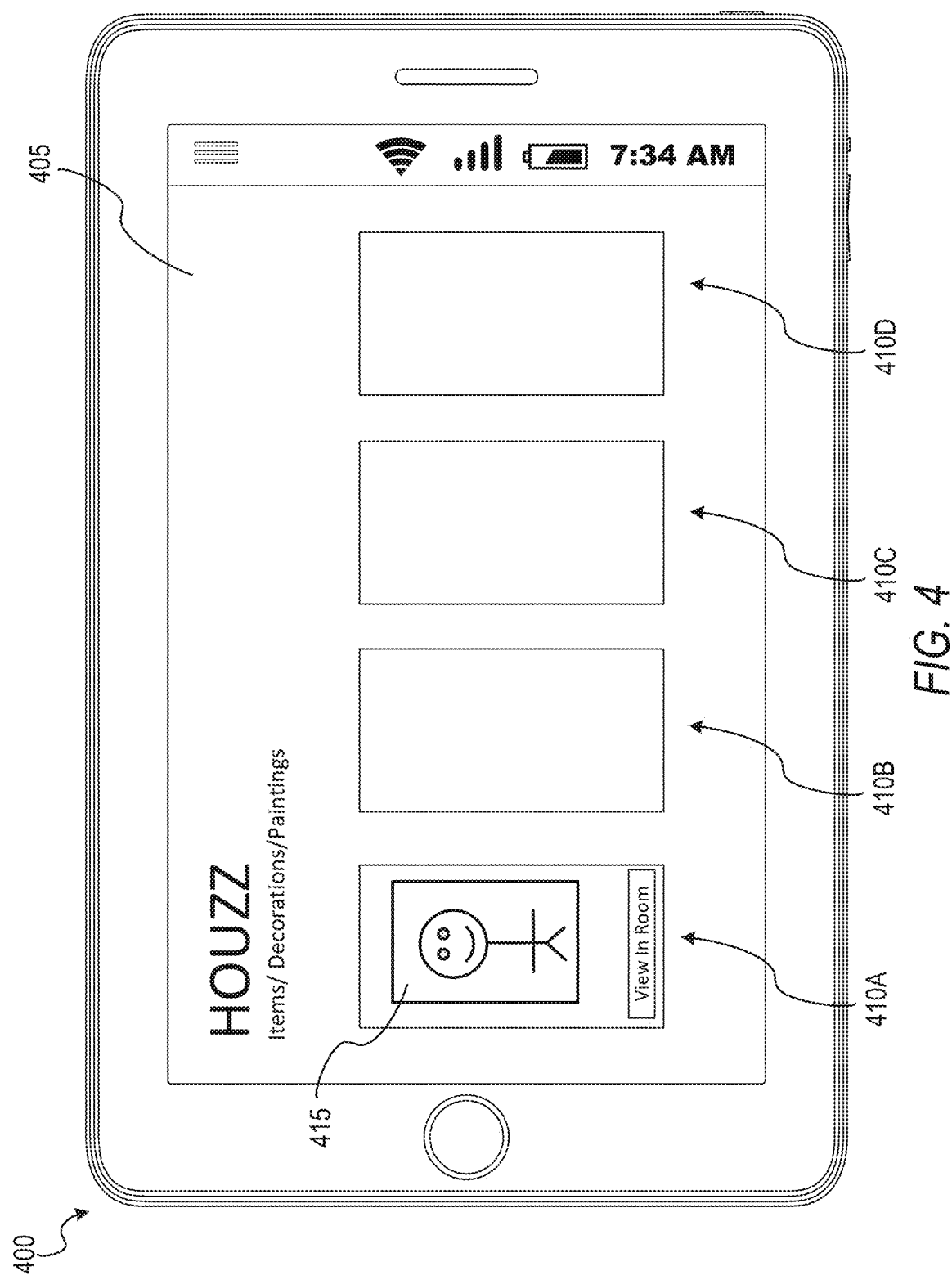
FIG. 4 shows an example client device displaying items, according to some example embodiments.

FIG. 4 shows an example client device 400 displaying items, according to some example embodiments. In FIG. 4, the client device 400 is displaying an application user interface 405 showing a plurality of thumbnails 410A-410D that the user (not depicted) can browse. The user interface 405 further provides an option for the user to view a given item in the user's immediate surroundings (e.g., a bedroom). For example, thumbnail 410A includes a "View In Room" button that the user can select to view the painting 415 on the wall of the room in which the user is operating the client device 400.

Figure 5:
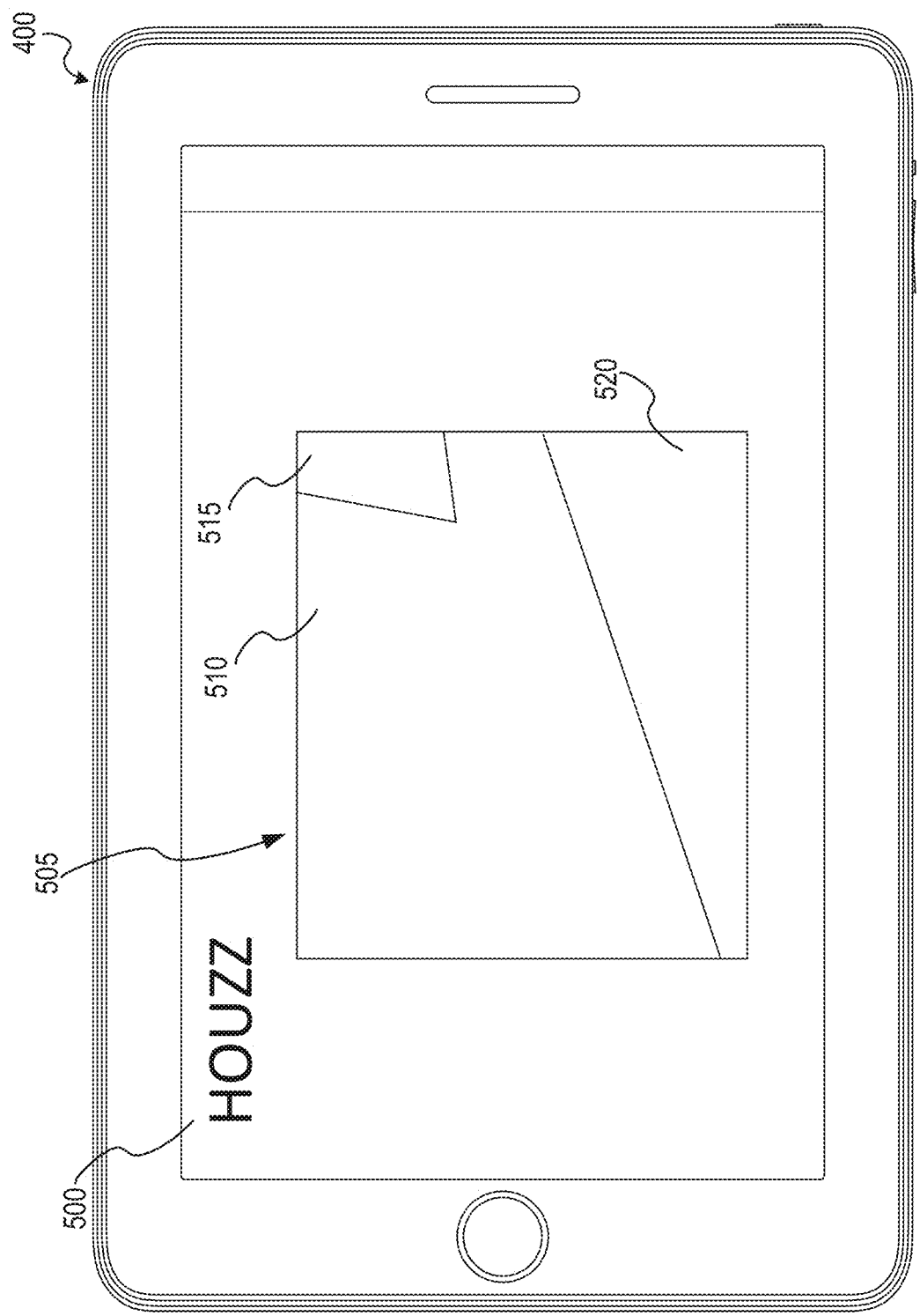
FIG. 5 shows the client device displaying a live video feed 505, according to some example embodiments.

FIG. 5 shows the client device 400 displaying a live video feed 505, according to some example embodiments. In response to the user selecting button in thumbnail 410A, a new user interface 500 is displayed that includes a live video feed 505 captured from an image sensor (not depicted) on the backside of client device 400. The video feed 505 displays the room in which the user of the client device 400 is standing. As illustrated, the room includes a floor 520, a wall 510, and a portion of a window 515. In some example embodiments, the user taps a location on the wall 510 that the user wants to place the painting 415.

Figure 6:
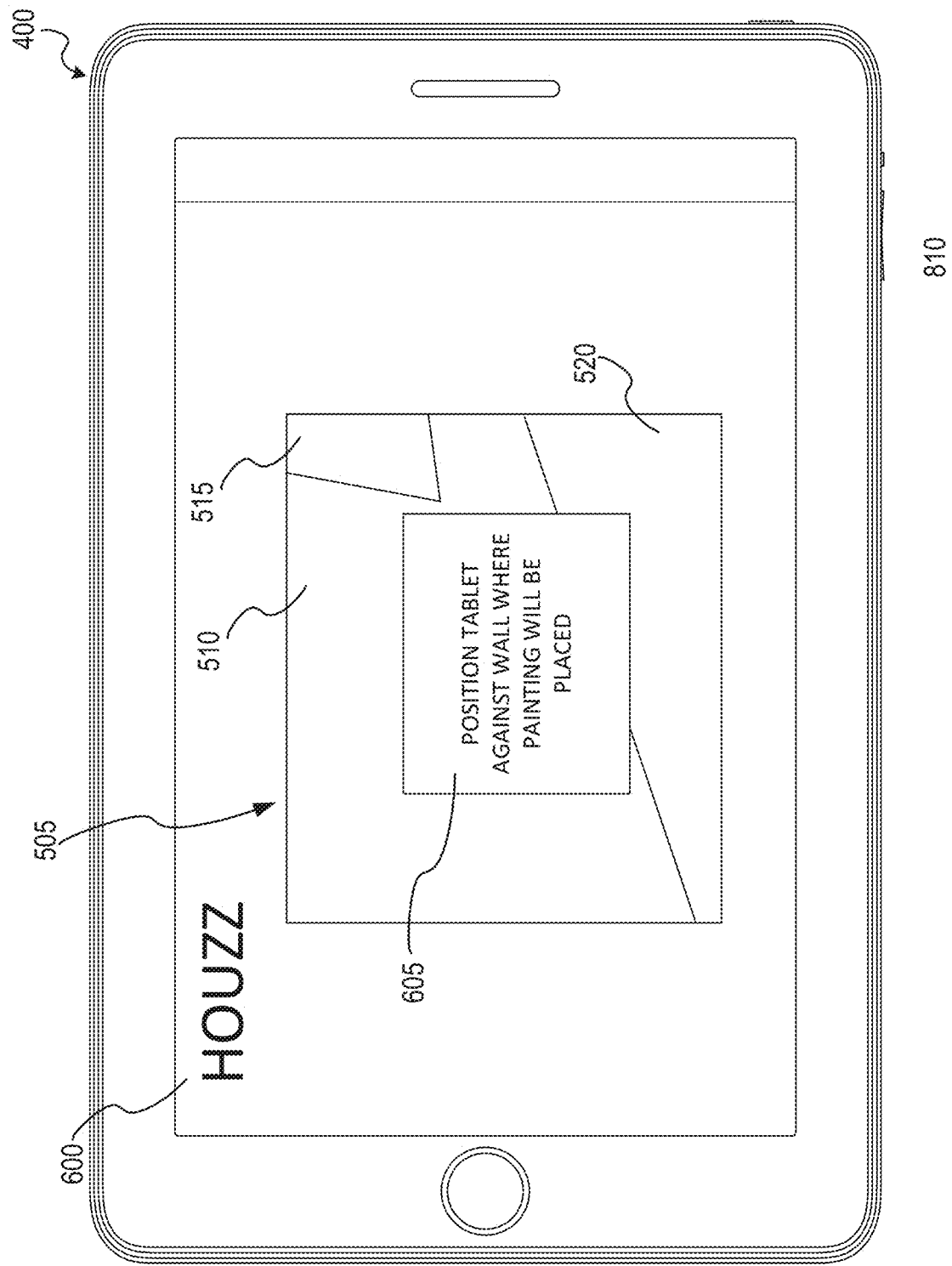
FIG. 6 shows a notification user interface according to some example embodiments.

FIG. 6 shows a notification user interface according to some example embodiments. Assuming the user taps a location on wall 510, user interface 600 is displayed on client device 400. User interface 600 displays a notification 605 that prompts the user to place the client device 400 flat against wall 510 where the user wants the painting 415 to appear. In some example embodiments, the user does not tap on the wall, and instead immediately upon selecting the "View in Room" button, notification 605 is displayed.

Figure 7:
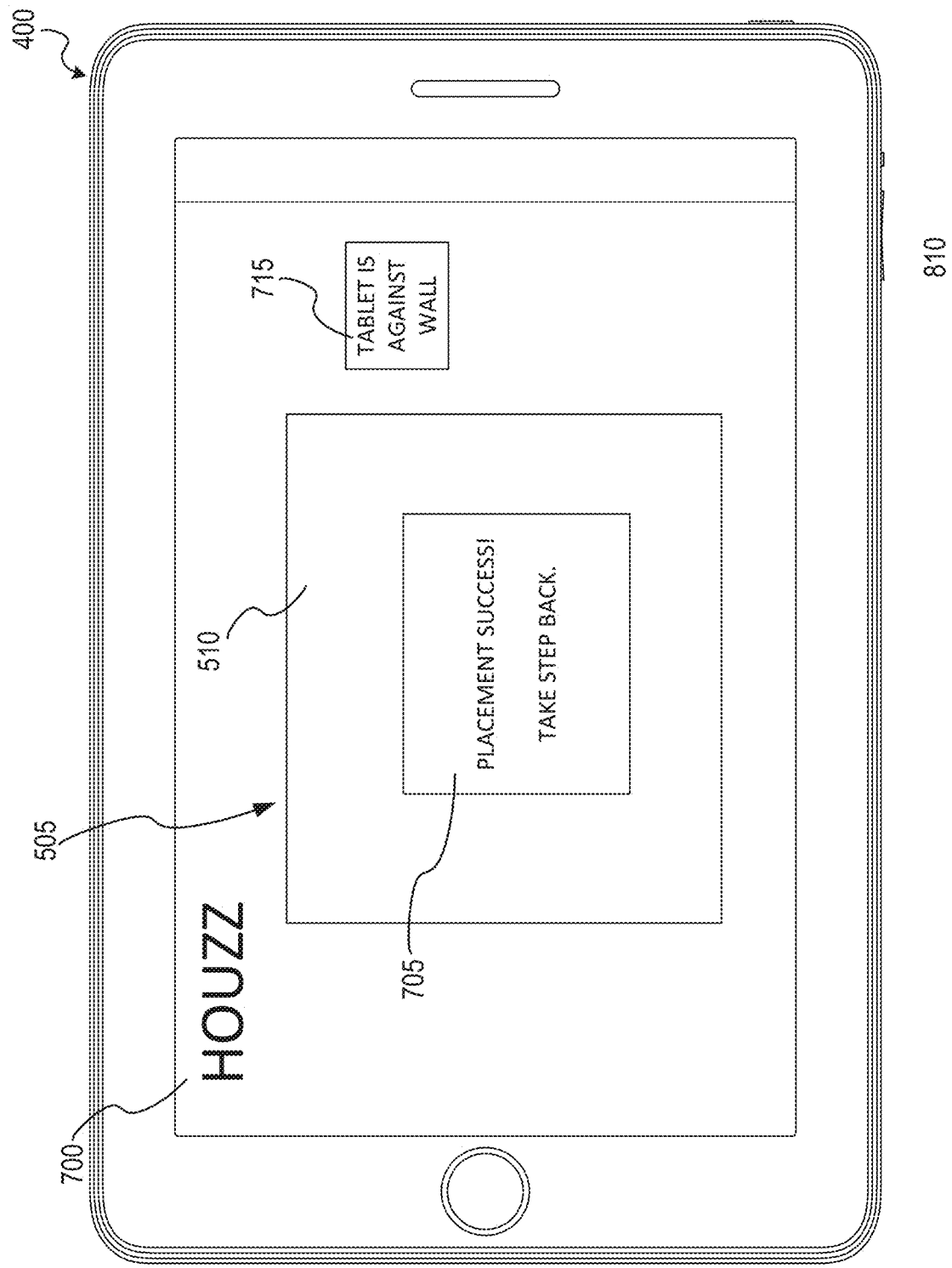
In FIG. 7, when the user device places the client device against the wall, user interface is displayed, according to some example embodiments.

In FIG. 7, when the user device places the client device 400 against the wall 510, user interface 700 is displayed, according to some example embodiments. As discussed with reference to FIG. 3B above, in some embodiments, the accelerometer of the client device 400 detects that the client device 400 has not moved for a pre-set period of time, e.g., 1 second. When the client device 400 has been still for the pre-set period of time, orientation data is collected to generate a virtual wall to place a 3D model of the painting 415. In some example embodiments, the user indicates that the client device 400 is flat against the wall by selecting a user interface element, such as button 715. In some embodiments, the button 715 is used instead of checking the accelerometer for lack of movement, as discussed above.

Figure 8:
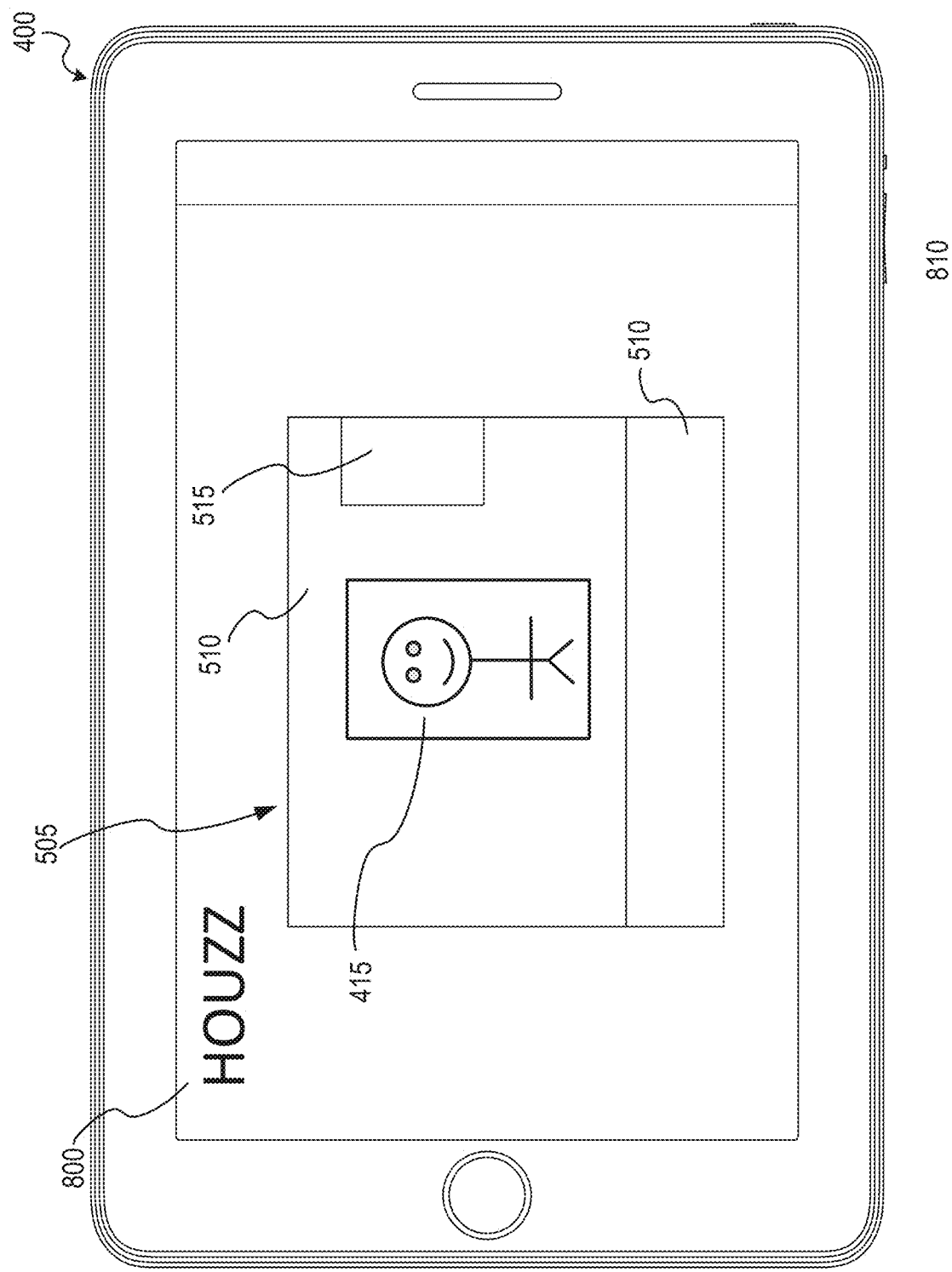
FIG. 8 shows a virtual object simulated on a physical wall, according to some example embodiments.

After the orientation data is collected and the 3D model of painting 415 has been placed on a virtual wall, a notification 705 is displayed indicating that the painting 415 has successfully been placed on the physical wall; that is, that the 3D model of the painting 415 has been placed on a newly generated virtual wall. The notification 705 can further prompt the user to move away from the wall 510. Moving to FIG. 8, when the user moves away from the wall 510, user interface 800 can be displayed on client device 400. User interface 800 displays the painting 415 appearing on the wall on the live video feed 505.

Figure 9:
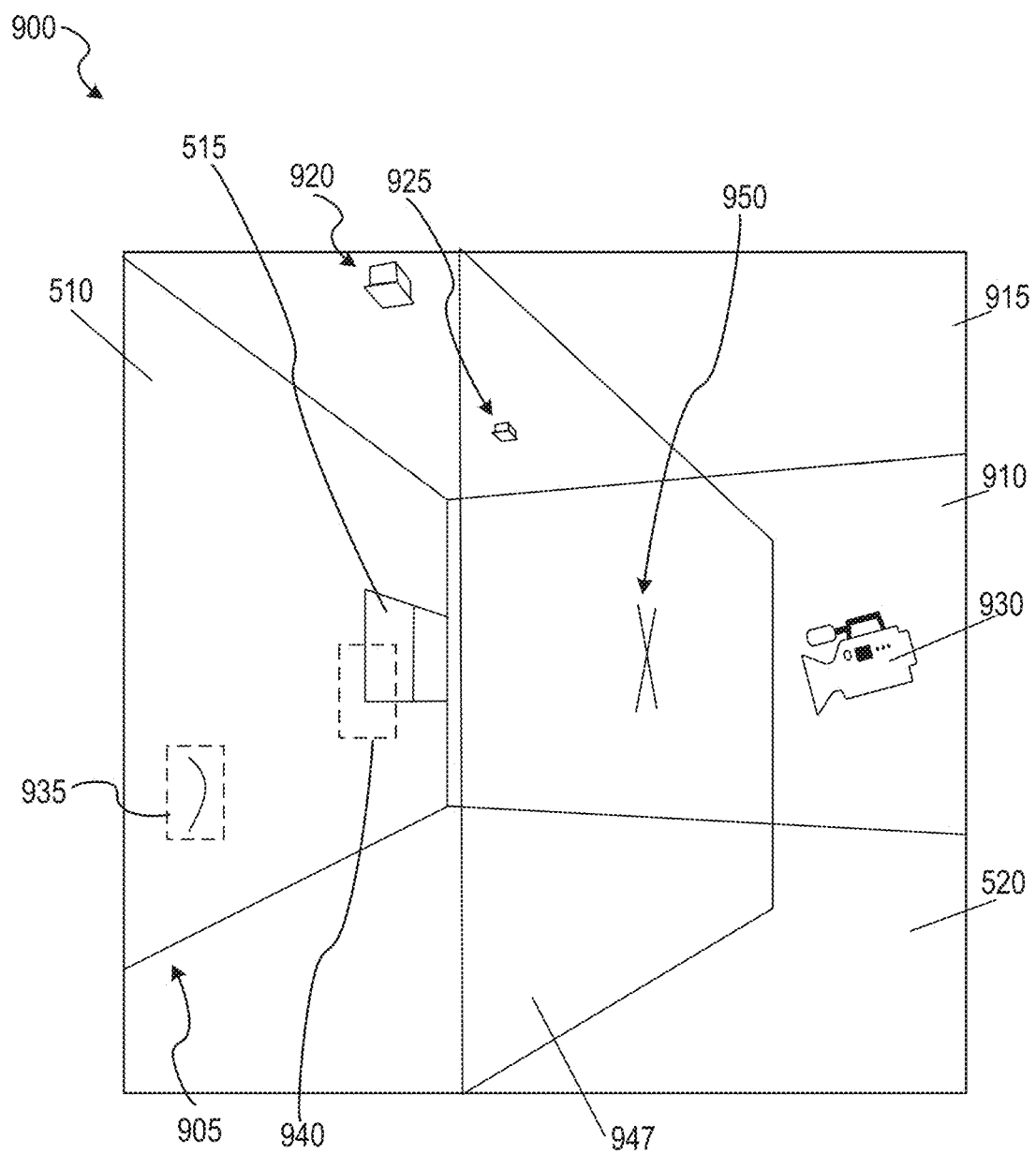
FIG. 9 shows an example room in which the user is operates the client device 400, according to some example embodiments.

FIG. 9 shows an example room 900 in which the user is operates the client device 400, according to some example embodiments. The room 900 includes the wall 510, the window 515, the floor 520, other walls such as wall 910, ceiling 915 which has two lights 920 and 925. The model engine 220 can create a virtual environment (e.g., a virtual room) and one or more virtual planes to correspond to physical planes of room in room 900. For example, the model engine 220 can create a horizontal 3D plane that is aligned with the floor 520 as discussed above. The model engine 220 can then place 3D object models on the horizontal 3D plane, and output one or more renders from the viewpoint of the virtual camera 930 for overlay on a live video feed. The virtual camera 930 is a 3D render camera used to create renders of objects from different perspectives. The tracking engine 230 moves the virtual camera 930 to coincide with the physical position of the client device 400 in the room according to image analysis (e.g., scale and transform of feature points in the room) and inertial sensor data (e.g., accelerometer data, compass/heading data). For example, if the user turns the client device 400 such that wall 510 is not visible (e.g., not in the field of view of a camera capturing the live feed) and wall 910 fills the view, then the tracking engine 230 determines distance and rotation amount and passes the tracking data to the modeling engine 220, which then turns the virtual camera 930 so that it does not image or render the wall 510. As discussed, according to some example embodiments, the tracking engine 230 performs image analysis on frames of live video feed to detect image features such as wall bump 935 or window corner 940 of the window 515. Other examples of trackable features include shadows cast by lights 920 and 925, edges such as edge 905, tables, and so forth. As discussed, floors, such as floor 520, can be detected using a gyroscope to detect the direction of gravity and/or using image feature analysis. In contrast, walls of a room, such as wall 510, wall 910, or glass wall 947 in the center of room 900, often lack features and are parallel to the direction of gravity thereby making them difficult to detect. To this end, the plane engine 210 can determine when the client device 110 is placed flat against a wall as discussed above, place an object in a 3D model of the room, then track the object as the client device 110 moves away from the wall. This approach can work well even with walls that have little to no features, such as glass wall 947. As an example, the user 106 places the client device 400 against a point 950 on the glass wall. The plane engine 210 detects lack of movement for the pre-specified period and can further check whether the device 110 is orthogonal to the floor 520. For example, when the client device 110 is placed against point 950, the virtual camera 930 that is modeling the room is also near or flush against the point 950. The angle between the virtual camera 930 and the floor 520 (e.g., a virtual horizontal plane set to the floor 520) is calculated to ensure the device 110 is orthogonal to the floor and thus a wall has been detected. After the wall has been detected, a virtual wall can be generated to correspond to the wall 947. In some embodiments, no virtual wall is generated but instead the coordinates (e.g., $\{x, y, z\}$) of the 3d model of the painting 415 are set to a virtual point that corresponds to point 950 on the real-world glass wall 947.

When the user moves the client device 110 away from the glass wall 647, the tracking engine 230 can detect movement using an accelerometer and analysis of feature points on the floor 520 or feature points, such as wall bump 935 and window corner 940, which are objects behind the glass wall 947. In this way, the vertical plane placement system 114 can efficiently detect walls, simulate 3D models of objects on the walls.

In some example embodiments, the model engine 220 renders the 3D model of the painting 415 using light data from light emanating from lights 920 and 925. For example, virtual lights can be placed at virtual points that correspond to the locations of light 920 and 925. As the client device 400 moves and the virtual camera 930 is moved to match the client device 400 movement, the reflections of light shown on textures of the virtual painting will change. In this way, more realistic renders can be created.

Figure 10:
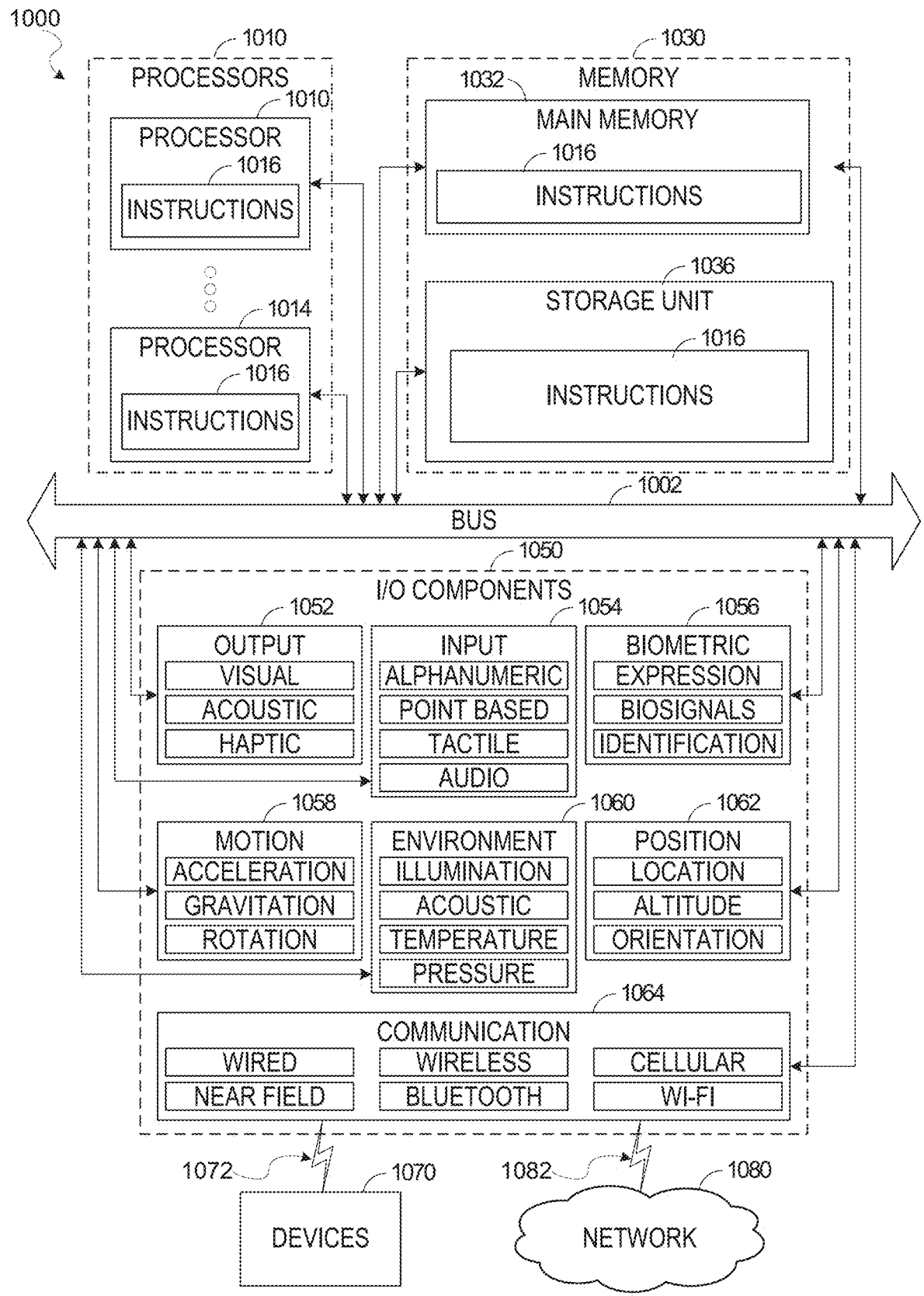
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions 1016 may cause the machine 1000 to execute the methods of FIG. 3A-3C. Further, the instructions 1016 may implement FIGS. 4-9, and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036, both accessible to the processors 1010 such as via the bus 1002. The main memory 1030, the static memory 1034, and storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms, other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or storage unit 1036 may store one or more sets of instructions and data structures (e.g., software) embodying or utilized by any one or more of the methodologies or functions described herein. These instructions (e.g., the instructions 1016), when executed by processor(s) 1010, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method comprising:
   receiving, via one or more processors of a client device, a selection of an item to be displayed vertically on a physical wall of a real-world environment;
   displaying, on the client device, a notification prompting a user of the client device to place the client device against the physical wall;
   detecting that the client device is placed against the physical wall at a position by using an inertial sensor of the client device to determine that the client device has not moved for a pre-specified period of time;
   positioning, in a virtual room modeled on the client device, a three-dimensional (3D) model of the selected item at a virtual point in front of a virtual camera in the virtual room, the virtual camera configured to generate renders of the 3D model of the selected item;
   generating, using a camera of the client device, a sequence of images of the real-world environment comprising the 3D model of the selected item overlaid on the physical wall at the position on the physical wall on which the client device was placed, the sequence of images generated at least in part by generating renders of the 3D model of the selected item at the virtual point as a virtual position of the virtual camera in the virtual room is continuously updated to correspond to changes of image features depicted in the sequence of images; and
   displaying, on a display device of the client device, the sequence of images.

2. The method of claim 1, wherein the changes of the image features include the image features moving closer together, and wherein the virtual position of the camera is moved farther from the virtual point of the 3D model of the selected item.

3. The method of claim 1, wherein the changes of the image features include the image features moving farther apart, and wherein the virtual position of the camera is moved closer to the virtual point of the 3D model of the selected item.

4. The method of claim 1, further comprising:
   detecting a floor of the real-world environment; and
   storing, as part of the virtual room, a horizontal plane corresponding to the detected floor.

5. The method of claim 4, wherein detecting that the client device is placed against the physical wall further comprises:
   generating, using an additional inertial sensor of the client device, angle data that describes a client device angle relative to the floor; and
   determining that a current angle between the horizontal plane and the client device angle is approximately orthogonal.

6. The method of claim 5, wherein the current angle is determined at least in part using a dot product operation.

7. The method of claim 5, wherein the additional inertial sensor is a gyroscope.

8. The method of claim 4, wherein the floor is detected by detecting co-planar image features in images of the floor.

9. The method of claim 1, wherein the inertial sensor is an accelerometer.

10. The method of claim 1, wherein the pre-specified period of time is approximately one second.

11. The method of claim 1, wherein the sequence of images is a video feed continuously generated by the camera of the client device as the client device moves around the real-world environment.

12. The method of claim 1, further comprising:
    detecting a light source in the real-world environment; and
    positioning a virtual light source in the virtual room.

13. The method of claim 12, wherein the renders of the 3D model of the selected item are generating using virtual rays from the virtual light source.

14. The method of claim 1, wherein the real-world environment is an enclosed room having a plurality of walls that includes the physical wall.

15. A system comprising:
    one or more processors of a machine; and
    a memory storing instructions that, when executed by the one or more processors, cause the machine to perform operations comprising:
    receiving, via one or more processors of a client device, a selection of an item to be displayed vertically on a physical wall of a real-world environment;
    displaying, on the client device, a notification prompting a user of the client device to place the client device against the physical wall;
    detecting that the client device is placed against the physical wall at a position by using an inertial sensor of the client device to determine that the client device has not moved for a pre-specified period of time;
    positioning, in a virtual room modeled on the client device, a three-dimensional (3D) model of the selected item at a virtual point in front of a virtual camera in the virtual room, the virtual camera configured to generate renders of the 3D model of the selected item;

generating, using a camera of the client device, a sequence of images of the real-world environment comprising the 3D model of the selected item overlaid on the physical wall at the position on the physical wall on which the client device was placed, the sequence of images generated at least in part by generating renders of the 3D model of the selected item at the virtual point as a virtual position of the virtual camera in the virtual room is continuously updated to correspond to changes of image features depicted in the sequence of images; and displaying, on a display device of the client device, the sequence of images.

16. A machine-readable storage medium embodying instructions that, when executed by a machine, cause the machine to perform operations comprising:

receiving, via one or more processors of a client device, a selection of an item to be displayed vertically on a physical wall of a real-world environment;

displaying, on the client device, a notification prompting a user of the client device to place the client device against the physical wall;

detecting that the client device is placed against the physical wall at a position by using an inertial sensor of the client device to determine that the client device has not moved for a pre-specified period of time;

positioning, in a virtual room modeled on the client device, a three-dimensional (3D) model of the selected item at a virtual point in front of a virtual camera in the virtual room, the virtual camera configured to generate renders of the 3D model of the selected item;

generating, using a camera of the client device, a sequence of images of the real-world environment comprising the 3D model of the selected item overlaid on the physical wall at the position on the physical wall on which the client device was placed, the sequence of images generated at least in part by generating renders of the 3D model of the selected item at the virtual point as a virtual position of the virtual camera in the virtual room is continuously updated to correspond to changes of image features depicted in the sequence of images; and displaying, on a display device of the client device, the sequence of images.

* * * * *